United States Patent
Park et al.

(10) Patent No.: US 11,885,057 B2
(45) Date of Patent: Jan. 30, 2024

(54) LAUNDRY TREATMENT MACHINE

(71) Applicant: LG ELECTRONICS INC., Seoul (KR)

(72) Inventors: Wonseok Park, Seoul (KR); Jieon Kim, Seoul (KR); Kiwook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 372 days.

(21) Appl. No.: 17/258,058

(22) PCT Filed: Jul. 5, 2019

(86) PCT No.: PCT/KR2019/008285
§ 371 (c)(1),
(2) Date: Jan. 5, 2021

(87) PCT Pub. No.: WO2020/009528
PCT Pub. Date: Jan. 9, 2020

(65) Prior Publication Data
US 2021/0222340 A1    Jul. 22, 2021

(30) Foreign Application Priority Data

Jul. 6, 2018 (KR) .................. 10-2018-0079050

(51) Int. Cl.
*D06F 33/42* (2020.01)
*D06F 34/10* (2020.01)
(Continued)

(52) U.S. Cl.
CPC .............. *D06F 33/42* (2020.02); *D06F 34/10* (2020.02); *D06F 37/30* (2013.01); *D06F 39/08* (2013.01)

(58) Field of Classification Search
CPC .......... D06F 33/40; D06F 33/42; D06F 33/47; D06F 33/60; D06F 33/62; D06F 33/74;
(Continued)

(56) References Cited

U.S. PATENT DOCUMENTS

2005/0044640 A1 * 3/2005 Hyeong ................ D06F 35/007
68/12.14
2017/0302208 A1 10/2017 Je et al.

FOREIGN PATENT DOCUMENTS

JP    H10-117996    5/1998
JP    2001-276485    10/2001
(Continued)

OTHER PUBLICATIONS

International Search Report (with English Translation) dated Nov. 5, 2019 issued in Application No. PCT/KR2019/008285.
(Continued)

*Primary Examiner* — David G Cormier
(74) *Attorney, Agent, or Firm* — KED & Associates LLP

(57) ABSTRACT

The present disclosure relates to a laundry treatment machine. A laundry treatment machine comprises: an inverter to convert the DC voltage from the converter into alternating current (AC) voltage by a switching operation and to output the converted AC voltage to a motor; and a controller that controls such that, while a washing tub motor is rotating at a constant speed, a drain motor operates in a first period during which the speed of the drain motor increases, a second period during which the speed of the drain motor decreases after the first period, and a third period during which the speed of the drain motor decreases after the second period, wherein a rising slope in the second period is less than a falling slope in the third period. Accordingly, a speed ripple of the drain motor may be reduced.

16 Claims, 14 Drawing Sheets

(51) Int. Cl.
*D06F 37/30* (2020.01)
*D06F 39/08* (2006.01)

(58) Field of Classification Search
CPC .......... D06F 34/10; D06F 37/30; D06F 39/08; D06F 39/082; D06F 39/083; D06F 39/085; D06F 2103/14; D06F 2103/24; D06F 2103/42; D06F 2103/48; D06F 2105/08; D06F 2105/48; A47L 15/001; A47L 15/4214; A47L 15/4225; A47L 2401/08; A47L 2501/05

See application file for complete search history.

(56) References Cited

FOREIGN PATENT DOCUMENTS

| | | |
|---|---|---|
| JP | 2002-166090 | 6/2002 |
| JP | 2009-006081 | 1/2009 |
| JP | 2014-004276 | 1/2014 |
| KR | 10-1756408 | 7/2017 |
| WO | WO 2013/035279 | 3/2013 |

OTHER PUBLICATIONS

Written Opinion dated Nov. 5, 2019 issued in Application No. PCT/KR2019/008285.

* cited by examiner

LAUNDRY TREATMENT MACHINE

CROSS-REFERENCE TO RELATED PATENT APPLICATIONS

This application is a U.S. National Stage Application under 35 U.S.C. 0 371 of PCT Application No. PCT/KR2019/008285, filed Jul. 5, 2019, which claims priority to Korean Patent Application No. 10-2018-0079050, filed Jul. 6, 2018, whose entire disclosures are hereby incorporated by reference.

BACKGROUND OF THE DISCLOSURE

1. Field of the Disclosure

The present disclosure relates to a laundry treatment machine, and more particularly, to a laundry treatment machine capable of reducing a speed ripple.

In addition, the present disclosure relates to a laundry treatment machine capable of reducing noise or vibration during dewatering.

In addition, the present disclosure relates to a laundry treatment machine capable of being driven in a sensorless manner.

In addition, the present disclosure relates to a laundry treatment machine capable of improving the stability of a converter.

In addition, the present disclosure relates to a laundry treatment machine capable of shortening the time taken to complete drainage.

2. Description of the Related Art

A drain pump driving apparatus drives a motor during drainage to discharge water introduced into a water introduction part to the outside.

When using an AC pump motor in order to drive a drain pump, the motor is normally driven by a constant speed operation with an input AC voltage.

For example, when the frequency of the input AC voltage is 50 Hz, the drain pump motor rotates at 3,000 rpm, and, when the frequency of the input AC voltage is 60 Hz, the drain pump motor rotates at 3,600 rpm.

Such an AC pump motor has a drawback such as an extended period of time for completion of drainage because the speed of the motor is not controlled during drainage.

In order to address the drawback, researches are being conducted to apply a DC brushless motor as a drain pump motor.

Japanese Laid-Open Patent Publications No. 2001-276485 and No. 2002-166090 disclose a DC brushless motor-based drain pump motor.

These prior art documents show the drawback that it takes longer to complete drainage because speed control is performed when controlling a drain pump motor.

Moreover, these prior art documents only disclose performing speed control when controlling a drain pump motor, but do not disclose a method for reducing a speed ripple of a drain motor.

SUMMARY

The present disclosure provides a laundry treatment machine capable of capable of reducing a speed ripple.

The present disclosure provides a laundry treatment machine capable of reducing noise or vibration during dewatering.

The present disclosure also provides a laundry treatment machine capable of driving a drain pump motor in a sensorless manner.

The present disclosure also provides a laundry treatment machine capable of improving the stability of a converter.

The present disclosure also provides a laundry treatment machine capable of shortening the time taken to complete drainage.

An embodiment of the present disclosure provides a laundry treatment machine comprising: an inverter to convert the DC voltage from the converter into alternating current (AC) voltage by a switching operation and to output the converted AC voltage to a motor; and a controller that controls such that, while a washing tub motor is rotating at a constant speed, a drain motor operates in a first period during which the speed of the drain motor increases, a second period during which the speed of the drain motor decreases after the first period, and a third period during which the speed of the drain motor decreases after the second period, wherein a rising slope in the second period is less than a falling slope in the third period.

In the laundry treatment machine according to an embodiment of the present disclosure, the controller controls a falling slope in the second period to be less than the rising slope in the first period.

In the laundry treatment machine according to an embodiment of the present disclosure, the controller controls such that the first period, the second period, and the third period are repeated.

In the laundry treatment machine according to an embodiment of the present disclosure, the controller controls the slope in the period in which the speed of the motor increases in the second period to be less than the falling slope in the third period or the rising slope in the first period.

In the laundry treatment machine according to an embodiment of the present disclosure, the controller controls to gradually decreases the speed of the motor when the speed of the motor decreases in the second period.

In the laundry treatment machine according to an embodiment of the present disclosure, the controller controls the power consumed by the motor in the second period to be the same.

In the laundry treatment machine according to an embodiment of the present disclosure, while the speed of the washing tub increases, the controller controls the drain motor to operate in a fourth period during which the speed of the drain motor increases, a fifth period during which the speed of the drain motor decreases after the fourth period, and a sixth period during which the speed of the drain motor decreases after the fifth period, wherein the falling slope in the fifth period is less than the falling slope in the sixth period.

In the laundry treatment machine according to an embodiment of the present disclosure, the controller controls such that the falling slope in the fifth period is less than the rising slope in the fourth period.

In the laundry treatment machine according to an embodiment of the present disclosure, the controller controls to repeat the fourth period, the fifth period, and the sixth period.

In the laundry treatment machine according to an embodiment of the present disclosure, the controller controls the slope in the period in which the speed of the motor increases in the fifth period to be less than the falling slope in the sixth period or the rising slope in the fourth period.

In the laundry treatment machine according to an embodiment of the present disclosure, the controller controls to gradually decreases the speed of the motor when the speed of the motor decreases in the fifth period.

In the laundry treatment machine according to an embodiment of the present disclosure, the controller controls the power consumed by the motor in the fifth period to be the same.

Advantageous Effects

An embodiment of the present disclosure provides a laundry treatment machine comprising: an inverter to convert the DC voltage from the converter into alternating current (AC) voltage by a switching operation and to output the converted AC voltage to a motor; and a controller that controls such that, while a washing tub motor is rotating at a constant speed, a drain motor operates in a first period during which the speed of the drain motor increases, a second period during which the speed of the drain motor decreases after the first period, and a third period during which the speed of the drain motor decreases after the second period, wherein a rising slope in the second period is less than a falling slope in the third period. Accordingly, a speed ripple of the drain motor may be reduced. Particularly, noise or vibration may be reduced during dewatering.

In the laundry treatment machine according to an embodiment of the present disclosure, the controller controls a falling slope in the second period to be less than the rising slope in the first period. Accordingly, a speed ripple of the drain motor may be reduced. Particularly, noise or vibration may be reduced during dewatering.

In the laundry treatment machine according to an embodiment of the present disclosure, the controller controls such that the first period, the second period, and the third period are repeated. Accordingly, a speed ripple of the drain motor may be reduced. Particularly, noise or vibration may be reduced during dewatering.

In the laundry treatment machine according to an embodiment of the present disclosure, the controller controls the slope in the period in which the speed of the motor increases in the second period to be less than the falling slope in the third period or the rising slope in the first period. Accordingly, a speed ripple of the drain motor may be reduced. Particularly, noise or vibration may be reduced during dewatering.

In the laundry treatment machine according to an embodiment of the present disclosure, the controller controls to gradually decreases the speed of the motor when the speed of the motor decreases in the second period. Accordingly, a speed ripple of the drain motor may be reduced. Particularly, noise or vibration may be reduced during dewatering.

In the laundry treatment machine according to an embodiment of the present disclosure, the controller controls the power consumed by the motor in the second period to be the same. Accordingly, the converter may supply constant power, thereby improving the stability of the converter. Also, the power control may shorten the time taken to complete drainage as compared to speed control.

In the laundry treatment machine according to an embodiment of the present disclosure, while the speed of the washing tub increases, the controller controls the drain motor to operate in a fourth period during which the speed of the drain motor increases, a fifth period during which the speed of the drain motor decreases after the fourth period, and a sixth period during which the speed of the drain motor decreases after the fifth period, wherein the falling slope in the fifth period is less than the falling slope in the sixth period. Accordingly, a speed ripple of the drain motor may be reduced. Particularly, noise or vibration may be reduced during dewatering.

In the laundry treatment machine according to an embodiment of the present disclosure, the controller controls such that the falling slope in the fifth period is less than the rising slope in the fourth period. Accordingly, a speed ripple of the drain motor may be reduced. Particularly, noise or vibration may be reduced during dewatering.

In the laundry treatment machine according to an embodiment of the present disclosure, the controller controls to repeat the fourth period, the fifth period, and the sixth period. Accordingly, a speed ripple of the drain motor may be reduced. Particularly, noise or vibration may be reduced during dewatering.

In the laundry treatment machine according to an embodiment of the present disclosure, the controller controls the slope in the period in which the speed of the motor increases in the fifth period to be less than the falling slope in the sixth period or the rising slope in the fourth period. Accordingly, a speed ripple of the drain motor may be reduced. Particularly, noise or vibration may be reduced during dewatering.

In the laundry treatment machine according to an embodiment of the present disclosure, the controller controls to gradually decreases the speed of the motor when the speed of the motor decreases in the fifth period. Accordingly, a speed ripple of the drain motor may be reduced. Particularly, noise or vibration may be reduced during dewatering.

In the laundry treatment machine according to an embodiment of the present disclosure, the controller controls the power consumed by the motor in the fifth period to be the same. Accordingly, the converter may supply constant power, thereby improving the stability of the converter. Also, the power control may shorten the time taken to complete drainage as compared to speed control.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

As used herein, the suffixes "module" and "unit" are added or used interchangeably to facilitate preparation of this specification and are not intended to suggest distinct meanings or functions. Accordingly, the terms "module" and "unit" may be used interchangeably.

Figure 1:
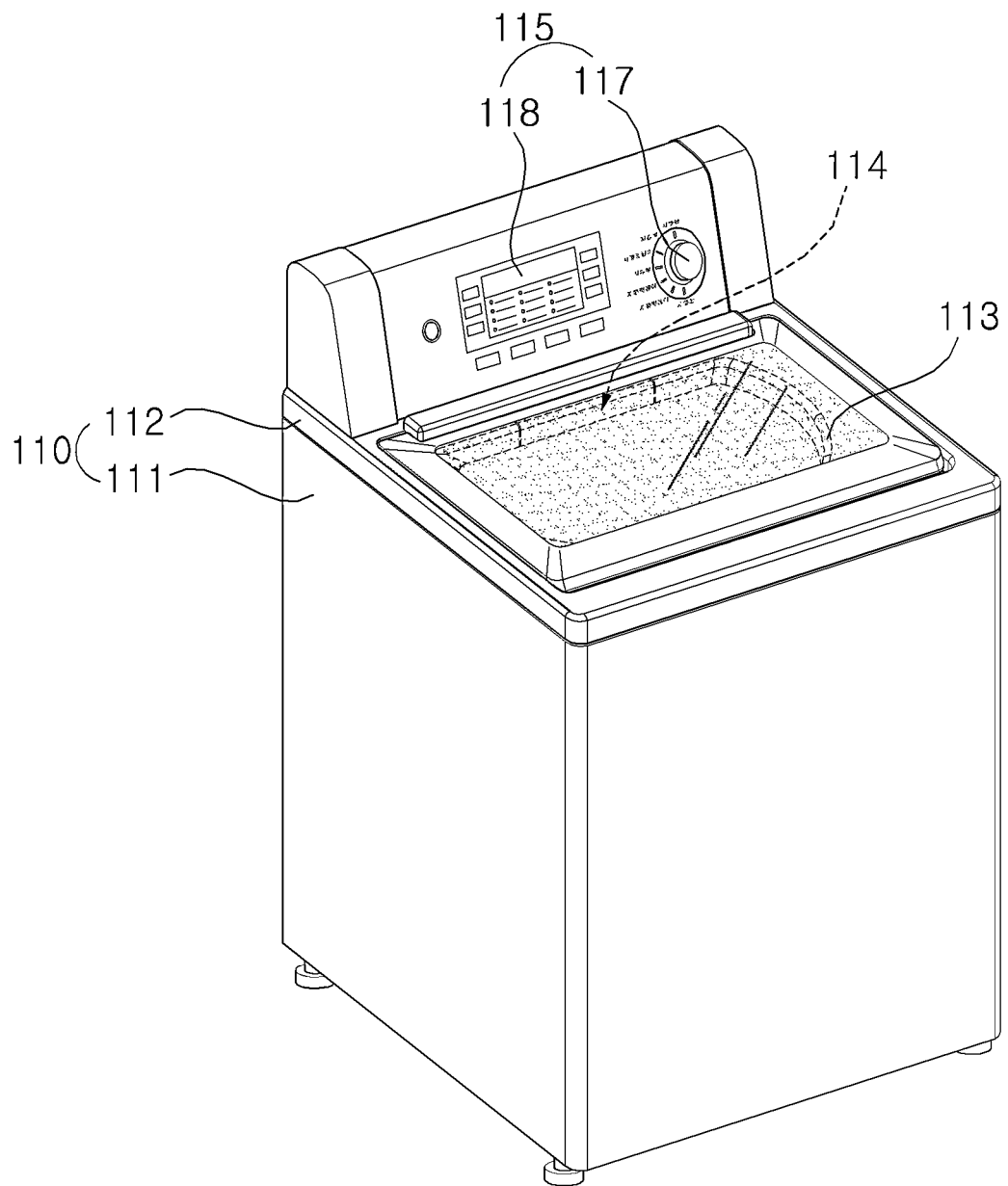
FIG. 1 is a perspective view illustrating a laundry treatment machine according to an embodiment of the present disclosure.
Figure 2:
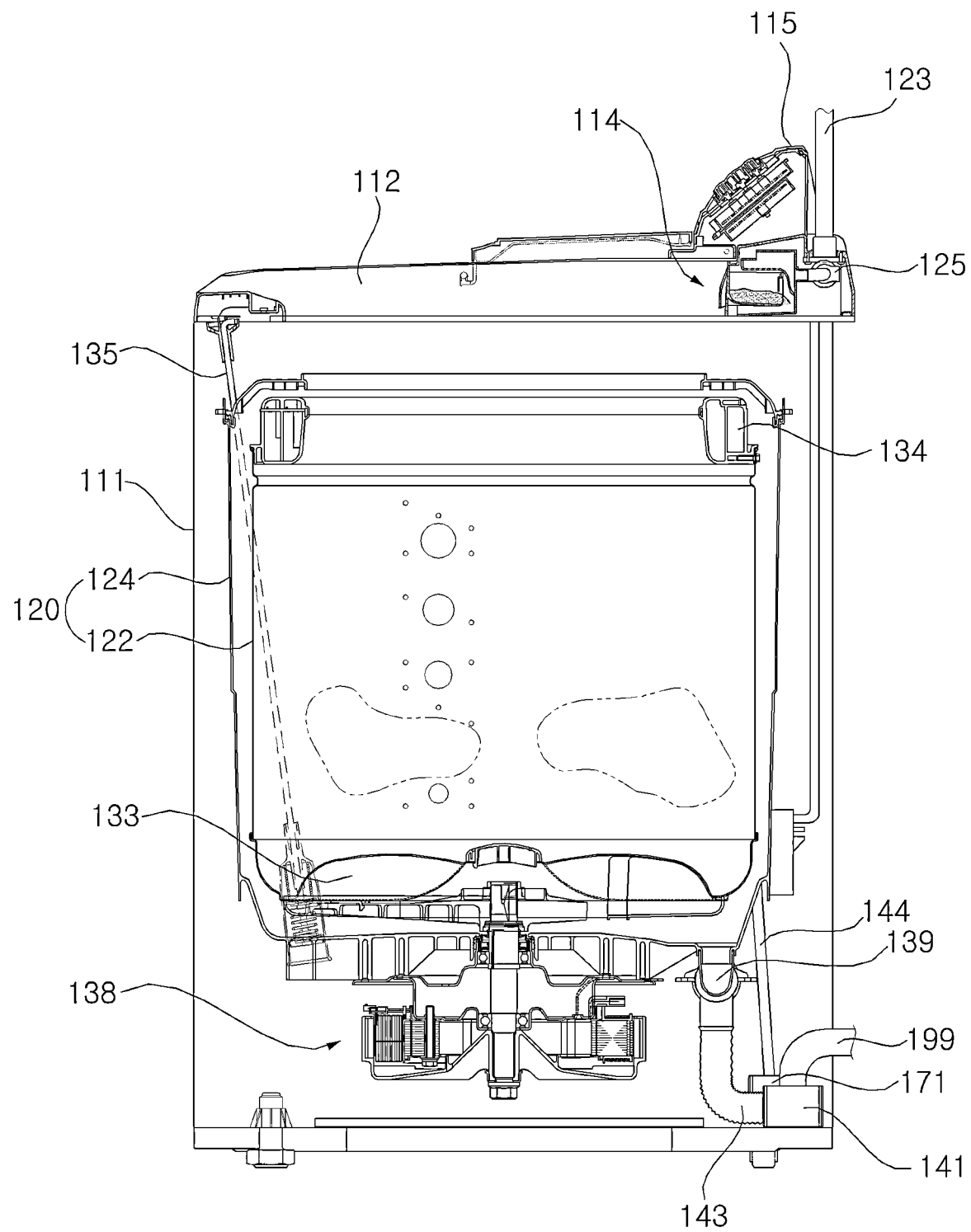
FIG. 2 is a side cross-sectional view of the laundry treatment machine of FIG. 1.

FIG. 1 is a perspective view illustrating a laundry treatment machine according to an embodiment of the present disclosure, and FIG. 2 is a side cross-sectional view illustrating the laundry treatment machine of FIG. 1.

Referring to FIGS. 1 and 2, the laundry treatment machine 100 according to an embodiment of the present disclosure conceptually includes a washing machine having fabric inserted therein for performing washing, rinsing and dewatering, or a dryer having wet fabric inserted therein. The washing machine will be mainly described below.

The washing machine 100 includes a casing 110 forming an outer appearance, operation keys for receiving various control commands from a user, and a control panel 115 equipped with a display for displaying information on the operating state of the washing machine 100 to provide a user interface, and a door 113 rotatably installed in the casing 110 to open and close an entrance hole through which the laundry enters and exits.

The casing 110 includes a body 111 for defining a space in which various components of the washing machine 100 can be accommodated and a top cover 112 provided at an upper side of the body 111 and forming a fabric entrance hole to allow the laundry to be introduced into an inner tub 122 therethrough.

The casing 110 is described as including the body 111 and the top cover 112, but the casing 110 is not limited thereto as long as it forms the appearance of the washing machine 100.

A support rod 135 is coupled to the top cover 112 which is one of the constituent elements of the casing 110. However, the support rod 135 is not limited thereto and may be coupled to any part of the fixed portion of the casing 110.

The control panel 115 includes operation keys 117 for controlling an operation state of the laundry treatment machine 100 and a display 118 disposed on one side of the operation keys 117 to display the operation state of the laundry treatment machine 100.

The door 113 opens and closes a fabric entrance hole (not shown) formed in the top cover 112 and may include a transparent member such as reinforced glass to allow the inside of the body 111 to be seen.

The washing machine 100 may include a washing tub 120. The washing tub 120 may include an outer tub 124 containing wash water and an inner tub 122 rotatably installed in the outer tub 124 to accommodate laundry. A balancer 134 may be provided at the upper portion of the washing tub 120 to compensate for unbalance amount generated when the washing tub 120 rotates.

Meanwhile, the washing machine 100 may include a pulsator 133 rotatably provided at a lower portion of the washing tub 120.

The driving apparatus 138 serves to provide a driving force for rotating the inner tub 122 and/or the pulsator 133. A clutch (not shown) for selectively transmitting the driving force of the driving apparatus 138 may be provided such that only the inner tub 122 is rotated, only the pulsator 133 is rotated, or the inner tub 122 and the pulsator 133 are rotated at the same time.

Figure 3:
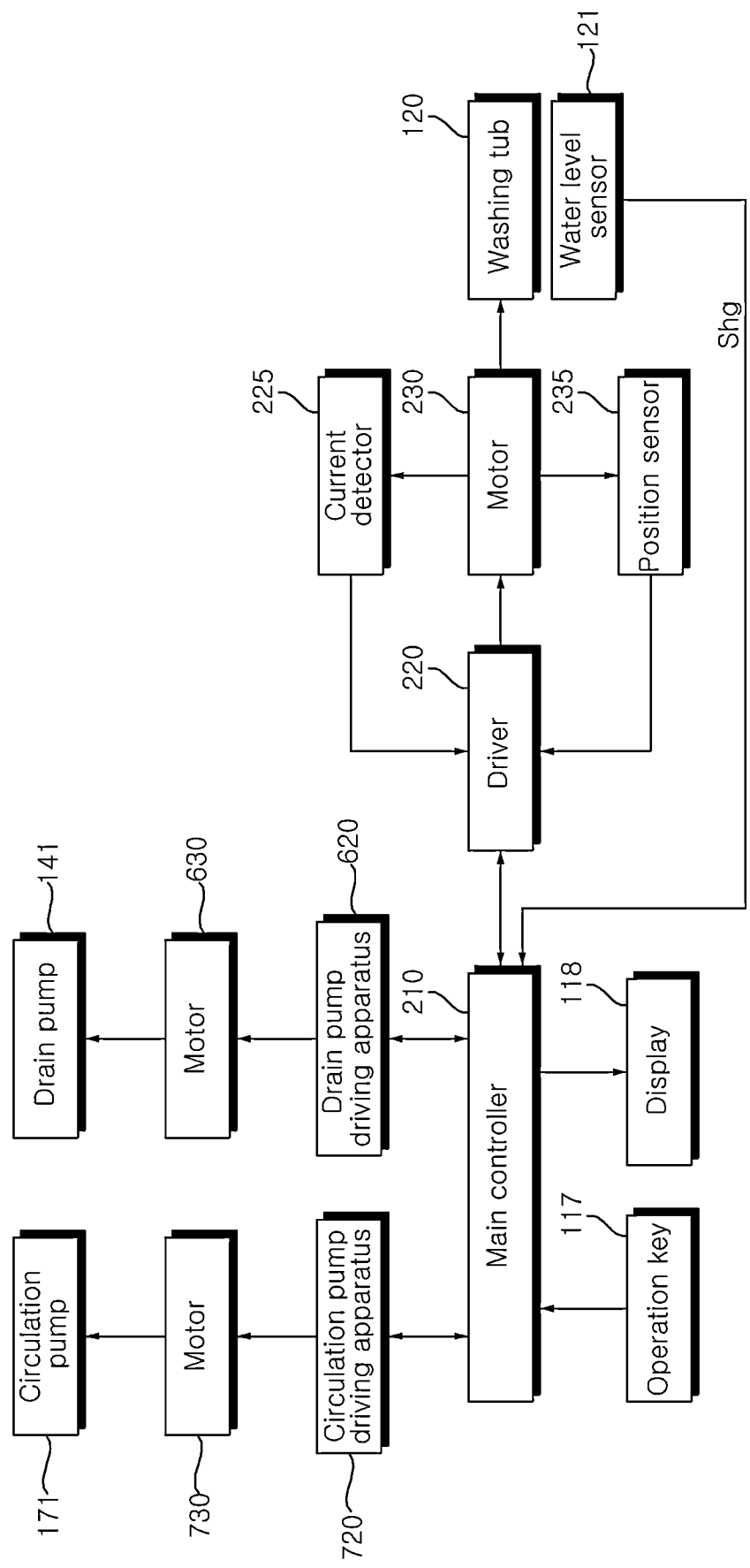
FIG. 3 is an internal block diagram of the laundry treatment machine of FIG. 1.

The driving apparatus 138 is operated by a driver 220 of FIG. 3, that is, a driving circuit. This will be described later with reference to FIG. 3 and other drawings.

A detergent box 114 for accommodating various additives such as a laundry detergent, a fabric softener, and/or a bleaching agent is retrievably provided to the top cover 112, and the wash water supplied through a water supply channel 123 flows into the inner tub 122 via the detergent box 114.

A plurality of holes (not shown) is formed in the inner tub 122. Thereby, the wash water supplied to the inner tub 122 flows to the outer tub 124 through the plurality of holes. A water supply valve 125 for regulating the water supply channel 123 may be provided.

The wash water is drained from the outer tub 124 through a drain channel 143. A drain valve 139 for regulating the drain channel 143 and a drain pump 141 for pumping the wash water may be provided.

Moreover, a circulation pump 171 for pumping wash water may be provided on an end of the drain channel 143. The wash water pumped by the circulation pump 171 may be introduced into a washing tub 120 through a circulation channel 144.

The support rod 135 is provided to hang the outer tub 124 in the casing 110. One end of the support rod 135 is connected to the casing 110 and the other end of the support rod 135 is connected to the outer tub 124 by a suspension 150.

The suspension 150 attenuates vibration of the outer tub 124 during the operation of the washing machine 100. For example, the outer tub 124 may be vibrated by vibration generated as the inner tub 122 rotates. While the inner tub 122 rotates, the vibration caused by various factors such as unbalance laundry amount of laundry in the inner tub 122, the rotational speed of the inner tub 122 or the resonance characteristics of the inner tub 122 can be attenuated.

FIG. 3 is an internal block diagram of the laundry treatment machine of FIG. 1.

Referring to FIG. 3, in the laundry treatment machine 100, the driver 220 is controlled by the main controller 210, and the driver 220 drives the washing tub motor 230. Thereby, the washing tub 120 is rotated by the washing tub motor 230.

Meanwhile, the laundry treatment machine 100 may include a drain motor 630 for driving the drain pump 141 and a drain pump driving apparatus 620 for driving the drain motor 630. The drain pump driving apparatus 620 may be controlled by the main controller 210.

Meanwhile, the laundry treatment machine 100 may include a motor 730 for driving the circulation pump 171 and a circulation pump driving apparatus 720 for driving the motor 730. The circulation pump driving apparatus 720 may be controlled by the main controller 210.

In this specification, the drain pump driving apparatus 620 may be referred to as a pump driver.

The main controller 210 operates by receiving an operation signal from an operation key 117. Accordingly, washing, rinsing, and dewatering processes may be performed.

In addition, the main controller 210 may control the display 118 to display a washing course, a washing time, a dewatering time, a rinsing time, a current operation state, or the like.

Meanwhile, the main controller 210 controls the driver 220 to operate the washing tub motor 230. For example, the main controller 210 may control the driver 220 to rotate the washing tub motor 230, based on a current detector 225 for detecting an output current flowing in the washing tub motor 230 and a position sensor 235 for sensing a position of the washing tub motor 230. While it is illustrated in FIG. 3 that the detected current and the sensed position signal are input to the driver 220, embodiments of the present disclosure are not limited thereto. The detected current and the sensed position signal may be input to the main controller 210 or to both the main controller 210 and the driver 220.

The driver 220, which serves to drive the washing tub motor 230, may include an inverter (not shown) and an inverter controller (not shown). In addition, the driver 220 may further include a converter or the like for supplying a direct current (DC) voltage input to the inverter (not shown).

For example, when the inverter controller (not shown) outputs a switching control signal in a pulse width modulation (PWM) scheme to the inverter (not shown), the inverter (not shown) may perform a high-speed switching operation to supply an alternating current (AC) voltage at a predetermined frequency to the washing tub motor 230.

The main controller 210 may sense a laundry amount based on a current io detected by the current detector 225 or a position signal H sensed by the position sensor 235. For example, while the washing tub 120 rotates, the laundry amount may be sensed based on the current value io of the washing tub motor 230.

The main controller 210 may sense an amount of eccentricity of the washing tub 120, that is, an unbalance (UB) of the washing tub 120. The sensing of the amount of eccentricity may be performed based on a ripple component of the current io detected by the current detector 225 or an amount of change in rotational speed of the washing tub 120.

Meanwhile, a water level sensor 121 may measure a water level in the washing tub 120.

For example, a water level frequency at a zero water level with no water in the washing tub 120 may be 28 KHz, and a frequency at a full water level at which water reaches an allowable water level in the washing tub 120 may be 23 KHz.

That is, the frequency of the water level detected by the water level sensor 121 may be inversely proportional to the water level in the washing tub.

The water level Shg in the washing tub output from the water level sensor 121 may be a water level frequency or a water level that is inversely proportional to the water level frequency.

Meanwhile, the main controller 210 may determine whether the washing tub 120 is at a full water level, a zero water level, or a reset water level, based on the water level Shg in the washing tub detected by the water level sensor 121.

Figure 4:
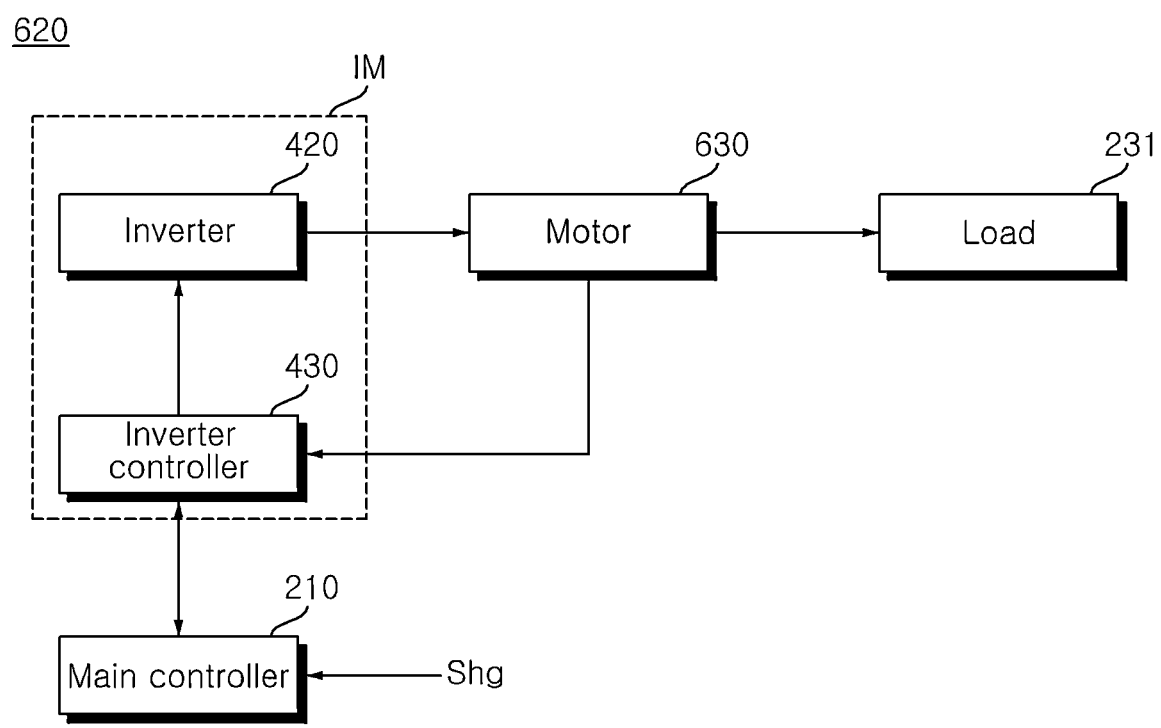
FIG. 4 illustrates an example of an internal block diagram of a drain pump driving apparatus of FIG. 1.
Figure 5:
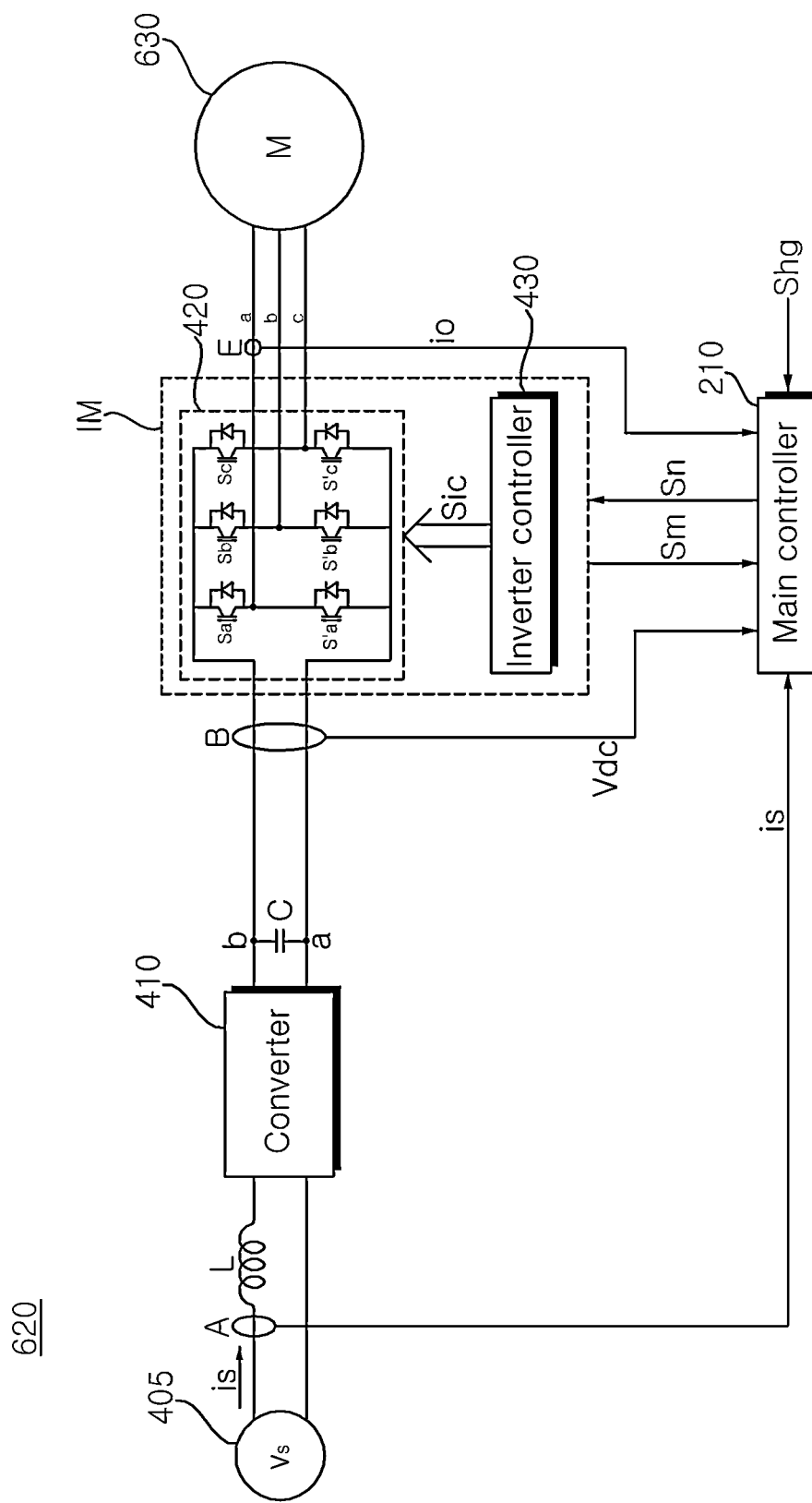
FIG. 5 illustrates an example of an internal circuit diagram of the drain pump driving apparatus of FIG. 4.

FIG. 4 illustrates an example of an internal block diagram of the drain pump driving apparatus of FIG. 1, and FIG. 5 illustrates an example of an internal circuit diagram of the drain pump driving apparatus of FIG. 4.

Referring to FIGS. 4 and 5, the drain pump driving apparatus 620 according to an embodiment of the present disclosure serves to drive the drain motor 630 in a sensorless manner, and may include an inverter 420, an inverter controller 430, and a main controller 210.

The main controller 210 and the inverter controller 430 may correspond to a controller and a second controller described in this specification, respectively.

The drain pump driving apparatus 620 according to an embodiment of the present disclosure may include a converter 410, a DC terminal voltage detector B, a DC terminal capacitor C, and an output current detector E. In addition, the drain pump driving apparatus 620 may further include an input current detector A and a reactor L.

Hereinafter, an operation of each constituent unit in the drain pump driving apparatus 620 of FIGS. 4 and 5 will be described.

The reactor L is disposed between a commercial AC voltage source 405 (vs) and the converter 410, and performs a power factor correction operation or a boost operation. In addition, the reactor L may also function to limit a harmonic current resulting from high-speed switching of the converter 410.

The input current detector A may detect an input current is input from the commercial AC voltage source 405. To this end, a current transformer (CT), a shunt resistor, or the like may be used as the input current detector A. The detected input current may be input to the inverter controller 430 or the main controller 210 as a discrete signal in the form of a pulse. In FIG. 5, it is illustrated that the detected input current is input to the main controller 210.

The converter 410 converts the commercial AC voltage source 405 having passed through the reactor L into a DC voltage and outputs the DC voltage. Although the commercial AC voltage source 405 is shown as a single-phase AC voltage source in FIG. 5, it may be a 3-phase AC voltage source. The converter 410 has an internal structure that varies depending on the type of commercial AC voltage source 405.

Meanwhile, the converter 410 may be configured with diodes or the like without a switching device, and may perform a rectification operation without a separate switching operation.

For example, in case of the single-phase AC voltage source, four diodes may be used in the form of a bridge. In case of the 3-phase AC voltage source, six diodes may be used in the form of a bridge.

As the converter 410, for example, a half-bridge type converter having two switching devices and four diodes connected to each other may be used. In case of the 3-phase AC voltage source, six switching devices and six diodes may be used for the converter.

When the converter 410 has a switching device, a boost operation, a power factor correction, and a DC voltage conversion may be performed by the switching operation of the switching device.

Meanwhile, the converter 410 may include a switched mode power supply (SMPS) having a switching device and a transformer.

The converter 410 may convert a level of an input DC voltage and output the converted DC voltage.

The DC terminal capacitor C smooths the input voltage and stores the smoothed voltage. In FIG. 5, one element is exemplified as the DC terminal capacitor C, but a plurality of elements may be provided to secure element stability.

While it is illustrated in FIG. 5 that the DC terminal capacitor C is connected to an output terminal of the converter 410, embodiments of the present disclosure are not limited thereto. The DC voltage may be input directly to the DC terminal capacitor C.

For example, a DC voltage from a solar cell may be input directly to the DC terminal capacitor C or may be DC-to-DC converted and input to the DC terminal capacitor C. Hereinafter, what is illustrated in FIG. 5 will be mainly described.

Both ends of the DC terminal capacitor C may be referred to as DC terminals or DC link terminals because the DC voltage is stored therein.

The DC terminal voltage detector B may detect a voltage Vdc between the DC terminals, which are both ends of the DC terminal capacitor C. To this end, the DC terminal voltage detector B may include a resistance element and an amplifier. The detected DC terminal voltage Vdc may be input to the inverter controller 430 or the main controller 210 as a discrete signal in the form of a pulse. In FIG. 5, it is illustrated that the detected DC terminal voltage Vdc is input to the main controller 210.

The inverter 420 may include a plurality of inverter switching devices. The inverter 420 may convert the smoothed DC voltage Vdc into an AC voltage by an on/off operation of the switching device, and output the AC voltage to the synchronous motor 630.

For example, when the synchronous motor 630 is in a 3-phase type, the inverter 420 may convert the DC voltage Vdc into 3-phase AC voltages va, vb and vc and output the 3-phase AC voltages to the three-phase synchronous motor 630 as shown in FIG. 5.

As another example, when the synchronous motor 630 is in a single-phase type, the inverter 420 may convert the DC voltage Vdc into a single-phase AC voltage and output the single-phase AC voltage to a single-phase synchronous motor 630.

The inverter 420 includes upper switching devices Sa, Sb and Sc and lower switching devices S'a, S'b and S'c. Each of the upper switching devices Sa, Sb and Sc that are connected to one another in series and a respective one of the lower switching devices S'a, S'b and S'c that are connected to one another in series form a pair. Three pairs of upper and lower switching devices Sa and S'a, Sb and S'b, and Sc and S'c are connected to each other in parallel. Each of the switching devices Sa, S'a, Sb, S'b, Sc and S'c is connected with a diode in anti-parallel.

Each of the switching devices in the inverter 420 is turned on/off based on an inverter switching control signal Sic from the inverter controller 430. Thereby, an AC voltage having a predetermined frequency is output to the synchronous motor 630.

The inverter controller 430 may output the switching control signal Sic to the inverter 420.

In particular, the inverter controller 430 may output the switching control signal Sic to the inverter 420, based on a voltage command value Sn input from the main controller 210.

The inverter controller 430 may output voltage information Sm of the drain motor 630 to the main controller 210, based on the voltage command value Sn or the switching control signal Sic.

The inverter 420 and the inverter controller 430 may be configured as one inverter module IM, as shown in FIG. 4 or 5.

The main controller 210 may control the switching operation of the inverter 420 in a sensorless manner.

To this end, the main controller 210 may receive an output current io detected by the output current detector E and a DC terminal voltage Vdc detected by the DC terminal voltage detector B.

The main controller 210 may calculate a power based on the output current io and the DC terminal voltage Vdc, and output a voltage command value Sn based on the calculated power.

In particular, the main controller 210 may perform power control to stably operate the drain motor 630 and output a voltage command value Sn based on the power control. Accordingly, the inverter controller 430 may output a switching control signal Sic corresponding to the voltage command value Sn based on the power control.

The output current detector E may detect an output current io flowing in the 3-phase drain motor 630.

The output current E may be disposed between the 3-phase drain motor 630 and the inverter 420 to detect an output current io flowing in the motor. In the drawing, it is illustrated that the a-phase current is detected, out of the phase current ia, ib, and ic which is the output current io flowing in the drain motor 630.

Meanwhile, as opposed to the drawing, the output current detector E may be disposed between the DC terminal capacitor C and the inverter 420 and sequentially detect the output current flowing in the motor. In this case, one shunt resistance element Rs may be used, and the phase current ia, ib, and ic flowing in the drain motor 630 may be detected in a time-division manner.

The detected output current io may be input to the inverter controller 430 or the main controller 210 as a discrete signal in the form of a pulse. In FIG. 5, it is illustrated that the detected output current io is input to the main controller 210.

The 3-phase drain motor 630 includes a stator and a rotor. The rotor rotates when the AC voltage at a predetermined frequency for each phase is applied to a coil of the stator for each phase (phase a, b or c).

Such a drain motor 630 may include a brushless DC (BLDC) motor.

The drain motor 630 may include, for example, a surface-mounted permanent-magnet synchronous motor (SMPMSM), an interior permanent magnet synchronous motor (IPMSM), and a synchronous reluctance motor (SynRM). The SMPMSM and the IPMSM are permanent magnet synchronous motors (PMSM) employing permanent magnets, while the SynRM has no permanent magnet.

Figure 6:
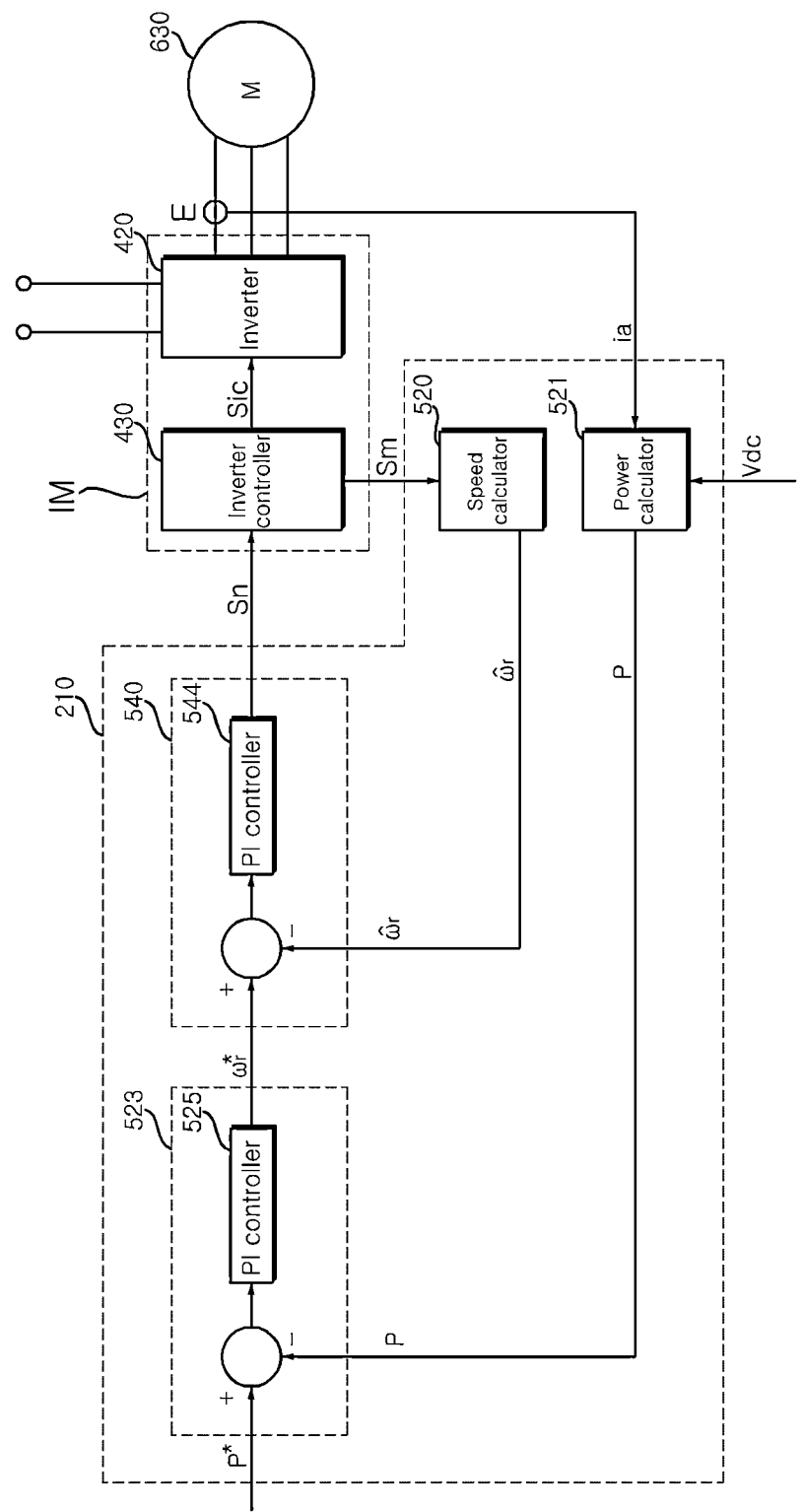
FIG. 6 is an internal block diagram of a main controller of FIG. 5.

FIG. 6 is an internal block diagram of a main controller of FIG. 5.

Referring to FIG. 6, the main controller 210 may include a speed calculator 520, a power calculator 521, a power controller 523, and a speed controller 540.

The speed calculator 520 may calculate a speed of the drain motor 630, based on the voltage information Sm of the drain motor 630 received from the inverter controller 430.

Specifically, the speed calculator 520 may calculate a zero crossing for the voltage information Sm of the drain motor 630 received from the inverter controller 430, and calculate a speed of the drain motor 630 based on the zero crossing.

The power calculator 521 may calculate a power P supplied to the drain motor 630, based on the output current io detected by the output current detector E and the DC terminal voltage Vdc detected by the DC terminal voltage detector B.

The power controller 523 may generate a speed command value ω*r based on the power P calculated by the power calculator 521 and a preset power command value P*r.

For example, the power controller 523 may generate the speed command value ω*r, while a PI controller 525 performs PI control, based on a difference between the calculated power P and the power command value P*r.

Meanwhile, the speed controller 540 may generate a voltage command value Sn, based on the speed calculated by the speed calculator 520 and the speed command value ω*r generated by the power controller 523.

Specifically, the speed controller 540 may generate the voltage command value Sn, while a PI controller 544 performs PI control, based on a difference between the calculated speed and the speed command value ω*r.

The generated voltage command value Sn may be output to the inverter controller 430.

The inverter controller 430 may receive the voltage command value Sn from the main controller 210, and generate and output an inverter switching control signal Sic in the PWM scheme.

The output inverter switching control signal Sic may be converted into a gate drive signal in a gate driver (not shown), and the converted gate drive signal may be input to a gate of each switching device in the inverter 420. Thus, each of the switching devices Sa, S'a, Sb, S'b, Sc and S'c in the inverter 420 performs a switching operation. Accordingly, the power control can be performed stably.

Meanwhile, during drainage, the main controller 210 according to the embodiment of the present disclosure may control the power supplied to the drain motor 630 to be constant without decreasing over time. Accordingly, the drainage time may be reduced.

Meanwhile, the main controller 210 according to the embodiment of the present disclosure may perform power control on the drain motor 630 at the start of drainage, and, when the remainder of the water is reached, may finish the power control. Accordingly, drainage operation may be performed efficiently.

The main controller 210 according to an embodiment of the present disclosure may control the voltage command value Sn and a duty of the switching control signal Sic to be greater as the output current io is at a smaller level. Accordingly, the drain motor 630 can be driven with a constant power.

The drain motor 630 according to an embodiment of the present disclosure may be implemented as a brushless DC motor 630. Accordingly, the power control, rather than constant-speed control, can be implemented in a simple manner.

Meanwhile, the main controller 210 according to another embodiment of the present disclosure may be configured to increase the speed of the drain motor 630 during the drainage in case in which the power supplied to the drain motor 630 does not reach the first power and to decrease the speed of the drain motor 630 in case in which the power supplied to the drain motor 630 exceeds the first power.

Meanwhile, the main controller 210 according to the embodiment of the present disclosure may control the speed of the drain motor 630 to be constant, in case in which the power supplied to the drain motor 630 reaches the first power.

Since the power control allows for driving at constant power as described above, the converter 410 supplies constant power, thereby improving the stability of the converter 410. Also, the power control allows for minimizing a decrease in drainage performance according to installation conditions.

Moreover, the drain motor 630 may be driven stably, and, therefore, the drainage time may be reduced.

Figure 7:
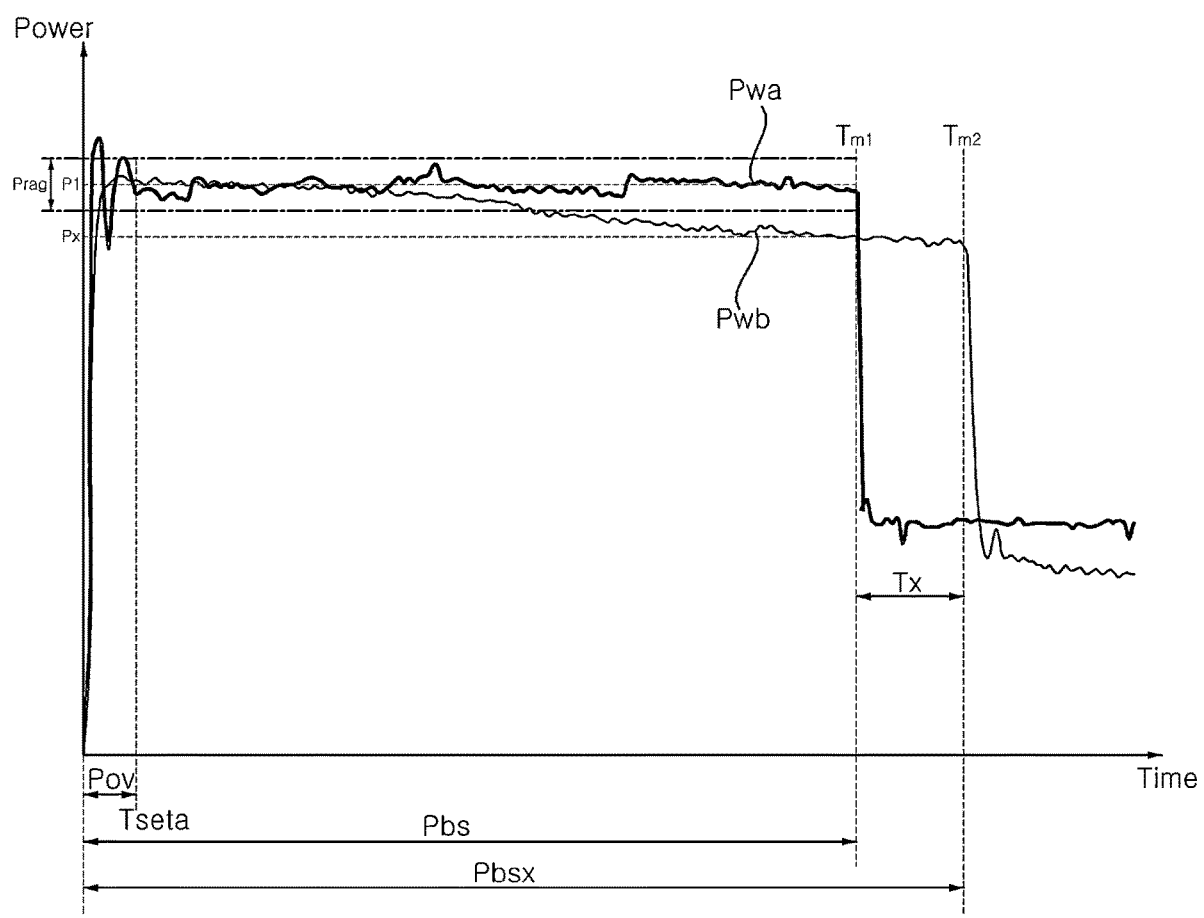
FIG. 7 is a view showing power supplied to a motor according to power control and speed control.

FIG. 7 is a view showing power supplied to a motor according to power control and speed control.

When the power control is performed as in the embodiments of the present disclosure, a time-dependent waveform of the power supplied to the drain motor 630 may be exemplified as Pwa.

FIG. 7 illustrates that the power is maintained in a substantially constant manner until time point Tm1 by performing the power control, and the power control is terminated at time point Tm1.

By performing the power control, the main controller 210 may control the power supplied to the drain motor 630, during the drainage, to be constant without decreasing over time, although the water level in the washing tub 120 decreases.

By performing the power control, the main controller 210 may control the power supplied to the drain motor 630, during the drainage, to be the first power P1.

In particular, even in case in which the lift is changed, the main controller 210 may control the power supplied to the drain motor 630, during the drainage, to be the constant first power P1, by performing the power control.

At this time, the constant first power P1 may mean that the drain motor 630 is driven with a power within a first allowable range Prag based on the first power P1. For example, the power within the first allowable range Prag may be a power pulsating within about 10% based on the first power P1.

In FIG. 7, it is illustrated that when the power control is performed, the drain motor 630 is driven with a power within the first allowable range Prag based on the first power P1 from time point Tseta until time point Tm1 when the drainage is completed, excluding an overshooting period Pov. Accordingly, water pumping can be performed smoothly even in case in which the lift is changed during the drainage. In addition, the stability of the converter 410 can be improved.

Here, the first allowable range Prag may be greater as the first power P1 is at a higher level. In addition, the first allowable range Prag may be greater as a drainage completion period Pbs is longer.

That is, when the lift is at a reference level Iref, the main controller 210 may control the drain motor 630 to be driven with a power within the first allowable range Prag based on the first power P1, without decreasing over time, from first time point Tseta after the drainage is started until time point Tm1 when the drainage is completed, and when the lift is at a second level, the main controller 210 may control the drain motor 630 to be driven with a power within the first allowable range Prag based on the first power P1, without decreasing over time, from first time point Tseta until time point Tm1 when the drainage is completed.

To this end, when the power control is performed during the drainage, the main controller 210 may calculate a power based on the output current io and the DC terminal voltage Vdc and output a voltage command value Sn based on the calculated power, and the inverter controller 430 may output a switching control signal Sic to the drain motor 630 based on the voltage command value Sn.

Meanwhile, the main controller 210 may control the voltage command value Sn and a duty of the switching control signal Sic to be greater as the output current io is at a smaller level. Accordingly, the drain motor 630 can be driven with a constant power.

Meanwhile, the main controller 210 may control the power supplied to the drain motor 630 to increase abruptly during a period PoV to perform power control.

Meanwhile, the main controller 210 may control the power supplied to the drain motor 630 to decrease abruptly from the time point Tm1.

Unlike the embodiments of the present disclosure, when the speed control is performed, that is, when the speed of the drain motor 630 is controlled to be maintained constantly, a time-dependent waveform of the power supplied to the drain motor 630 may be exemplified as Pwb.

In the drawing, it is illustrated that the speed control is performed until time point Tm2, and the speed control is terminated at time point Tm2.

The waveform Pwb of the power based on the speed control indicates that the power supplied to the drain motor 630 may be gradually reduced, while the speed of the drain motor 630 is constant, as the water level in the washing tub decreases during the drainage.

In FIG. 7, it is illustrated that, during a speed control period Pbsx, the power supplied to the drain motor 630 is gradually reduced up to approximately Px at time point Tm2 when the drainage is completed.

Accordingly, the time when the operation of the drain motor 630 is terminated in a case where the speed control is performed is Tm2, which is delayed by approximately period Tx, when compared to that in a case where the power control is performed.

Consequently, according to the embodiments of the present disclosure, since the power control is performed during the drainage, the drainage time can be shortened by approximately period Tx, when compared to that in the case where the speed control is performed. In addition, the power supplied from the converter 410 can be kept constant, thereby improving the operation stability of the converter 410.

Meanwhile, the dewatering may be performed in each of the washing, rinsing and dewatering strokes.

For example, the dewatering may be performed during the washing stroke, rinsing stroke, and dewatering stroke. Drainage may be performed during the dewatering, and therefore the drain motor 630 may be operated.

Meanwhile, the washing tub motor 230 for supplying torque to the washing tub 120 may be operated for dewatering, and the drain motor 630 may be operated for drainage.

Meanwhile, in case in which the drain pump 141 is not fully filled with washwater but only part of it, it may be referred to as a residual water state.

If the drain motor operates with the residual water remaining, a speed ripple may occur in the drain motor 630 due to the movement of the residual water. Also, noise, vibration, etc. may be generated by the speed ripple. This will be described with reference to FIGS. 8A to 8B.

Figure 8A:
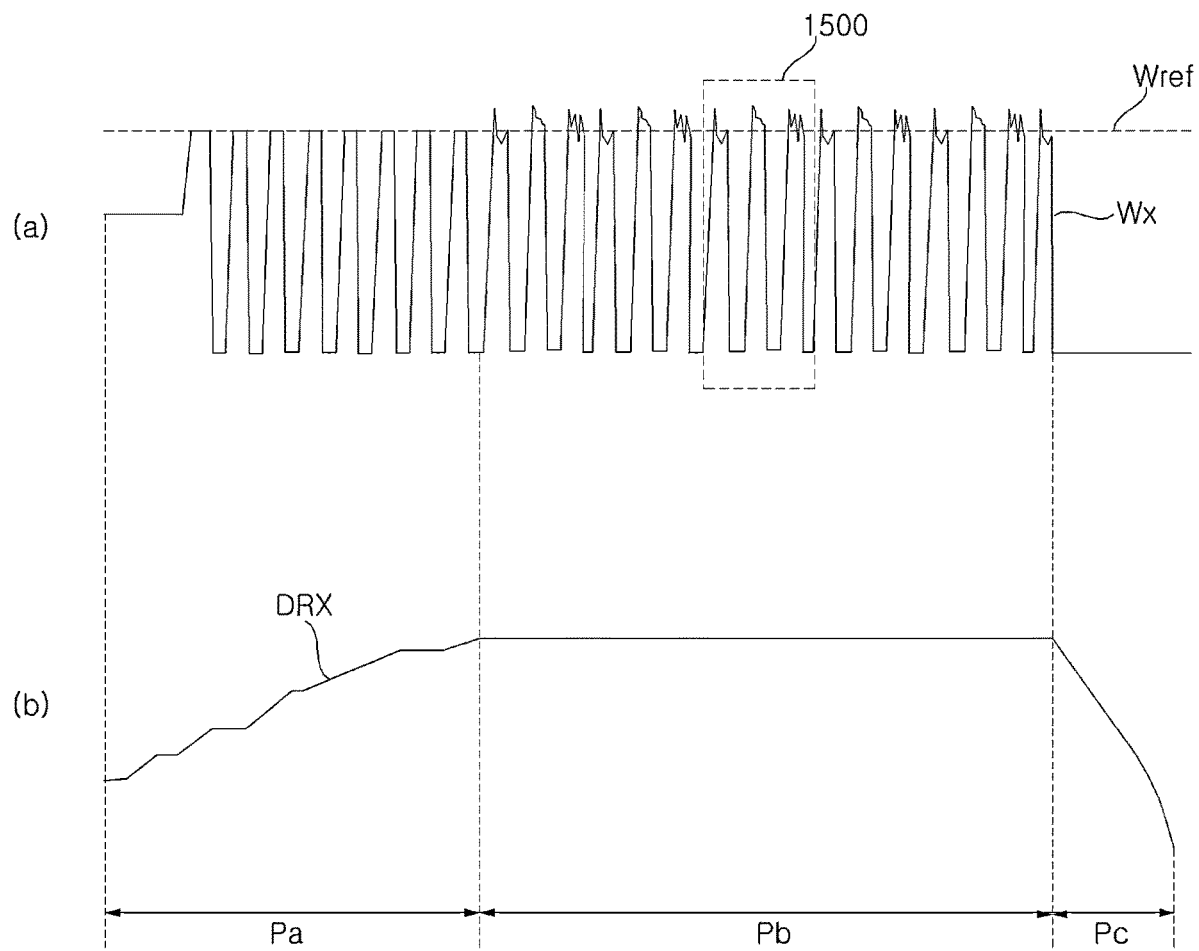
FIGS. 8A and 8B are views illustrating a speed ripple of a drain motor.
Figure 8B:
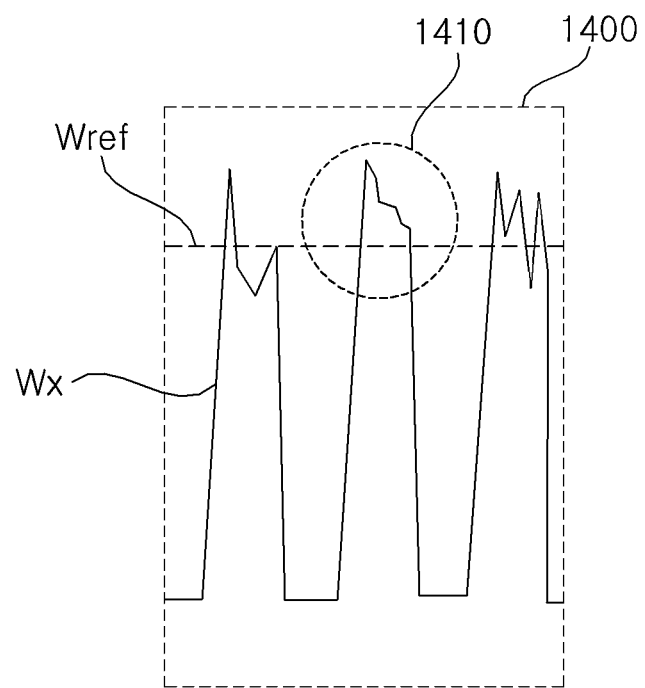

FIGS. 8A and 8B are views illustrating a speed ripple of a drain motor.

Referring to the drawing, (a) of FIG. 8A indicates the speed Wx of rotation of the drain motor 630, and (b) of FIG. 8A indicates the speed DRx of rotation of the washing tub 120.

During a period Pa, dewatering starts and the speed DRx of rotation of the washing tub 120 increases, and during a period Pb, the speed DRx of rotation of the washing tub 120 is kept at a constant level. Also, during a period Pc, dewatering is completed, and the speed DRx of rotation of the washing tub 120 decreases and stops.

When the laundry treatment machine 100 performs dewatering, the drain motor 630 may repeat on and off operations as in the drawings. Particularly, when the drain motor 630 is turned on, it may operate at a set speed Wref.

Meanwhile, during high-speed dewatering of the laundry treatment machine 100, that is, during the period Pb, water is not discharged smoothly compared to the period Pa, thus leading to a residual water state as described above.

Accordingly, as in the drawings, a speed ripple exceeding the set speed Wref occurs quite often. Due to the speed ripple, noise and vibration may be generated.

FIG. 8B is an enlarged view of a specific period 1400 of FIG. 8A, which shows that the speed Wx of rotation of the drain motor 630 exceeds the set speed Wref.

The present disclosure proposes a method for reducing a speed ripple generated when the laundry treatment machine 100 performs dewatering.

The main controller 210 according to an embodiment of the present disclosure controls the speed of the motor 630 to slow down based on a speed ripple of the motor 630 during dewatering. Accordingly, a speed ripple of the drain motor may be reduced during dewatering. Particularly, noise or vibration may be reduced during dewatering. This will be described in more details with reference to FIG. 9 and the subsequent drawings.

Meanwhile, the main controller 210 according to another embodiment of the present disclosure may control such that a speed ripple of the motor 630 is sequentially lowered during dewatering. Accordingly, a speed ripple of the drain motor may be reduced during dewatering. Particularly, noise or vibration may be reduced during dewatering.

Meanwhile, in case in which a speed ripple of the motor 630 exceeds a set value a predetermined number of times or more, the main controller 210 according to yet another embodiment of the present disclosure may control such that the speed ripple of the motor 630 is sequentially lowered. Accordingly, a speed ripple of the drain motor may be reduced during dewatering. Particularly, noise or vibration may be reduced during dewatering.

Figure 9:
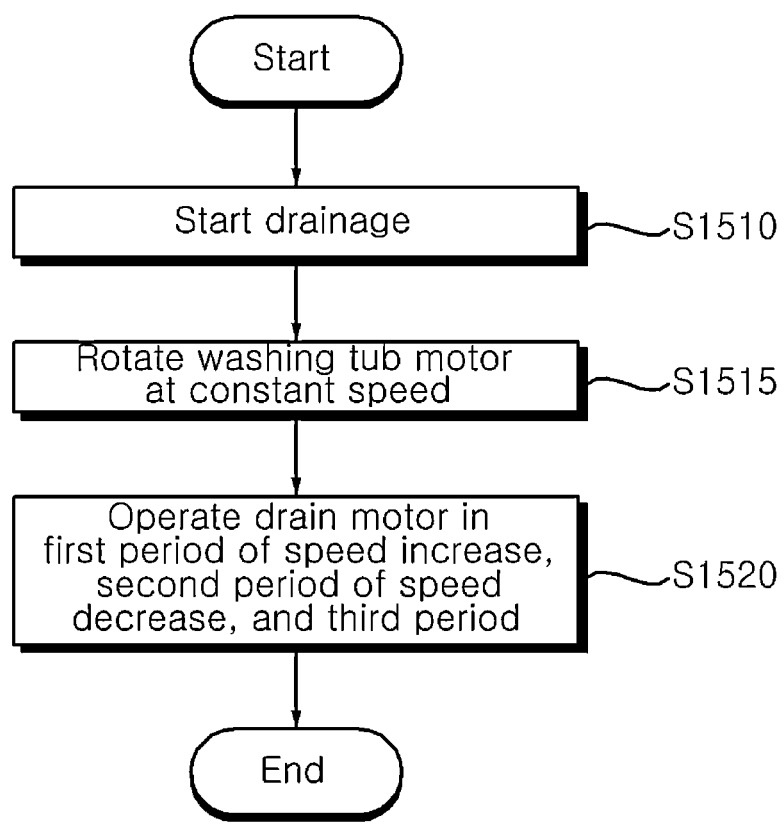
FIG. 9 is a sequential chart illustrating an operation method for a laundry treatment machine according to an embodiment of the present disclosure.
Figure 10:
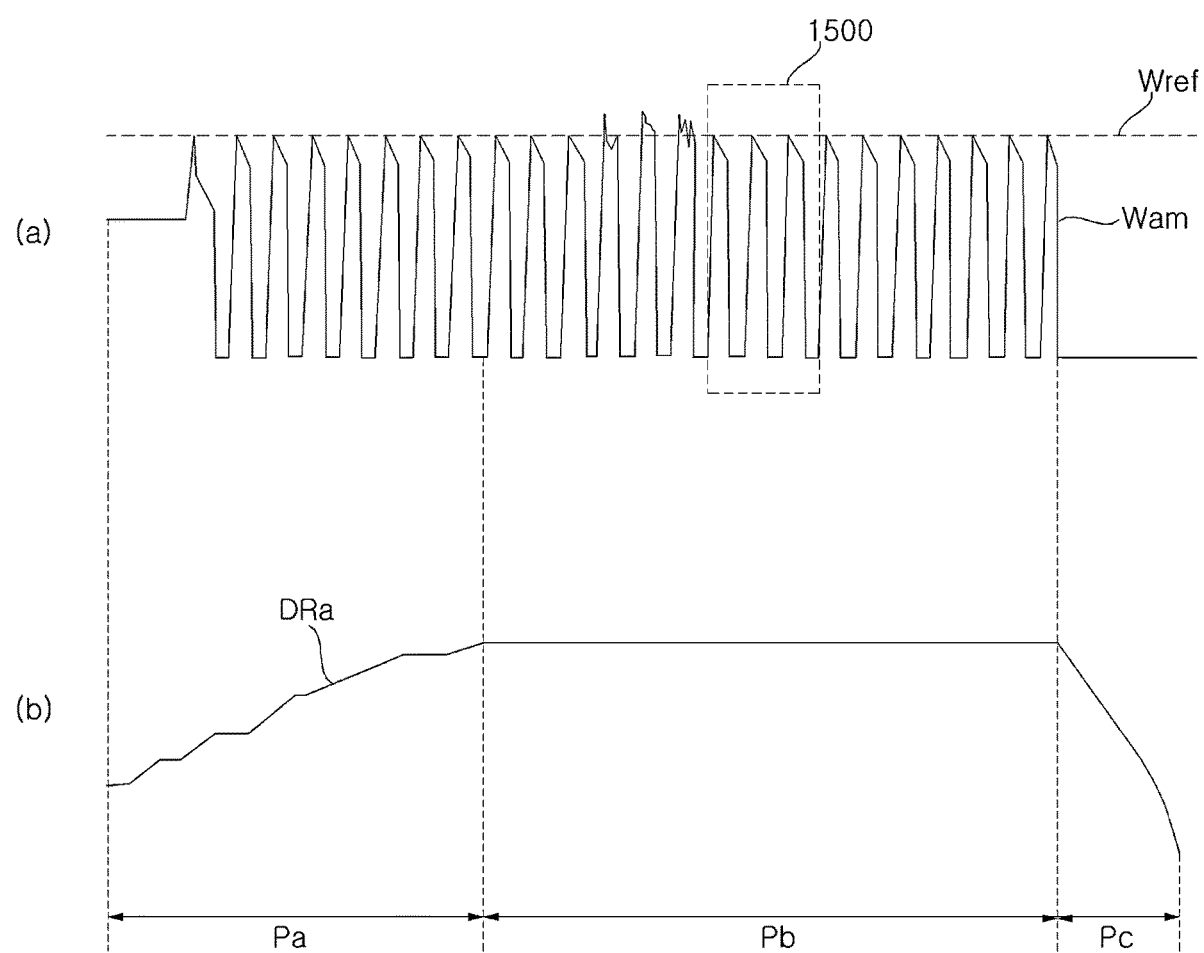
FIGS. 10 to 11C are views referred to in the description of the operation method of FIG. 9.

FIG. 9 is a sequential chart illustrating an operation method for a laundry treatment machine according to an embodiment of the present disclosure. FIGS. 10 to 11C are views referred to in the description of the operation method of FIG. 9.

First of all, referring to FIG. 9, the main controller 210 controls such that dewatering is started upon entering into a dewatering process. Accordingly, the main controller 210 may control the washing tub 120 to rotate at a set speed.

Next, the main controller 210 may control the washing tub motor 230 to increase its speed and rotate at a given speed after the start of dewatering.

Next, the main controller 210 may control such that, while the washing tub motor 230 is rotating at a constant speed, the drain motor 630 operates in a first period Pra during which the speed of the drain motor 630 increases, a second period Pfa during which the speed of the drain motor 630 decreases after the first period Pra, and a third period Pfb during which the speed of the drain motor 630 decreases after the second period Pfa.

Preferably, the falling slope in the second period Pfa is less than the falling slope in the third period Pfb.

As compared to FIG. 8A, there are a second period Pfa during which the speed of the drain motor 630 decreases after the first period Pra, and a third period Pfb during which the speed of the drain motor 630 decreases after the second period Pfa, and the falling slope in the second period Pfa is set to be less than the falling slope in the third period Pfb, thereby reducing a speed ripple generated during the second period Pfa or third period Pfb. Accordingly, noise or vibration may be reduced during dewatering.

(a) of FIG. 10 shows a speed waveform Wam of the drain motor 630, and (b) of FIG. 10 shows a speed waveform Dra of the washing tub motor 230.

The main controller 210 may control such that the speed of the washing tub motor 230 increases during the period Pa after the start of dewatering.

Next, the main controller 210 may control such that the speed of the washing tub motor 230 is constant during the period Pb after the period Pa. Accordingly, high-speed dewatering or the like may be performed.

Meanwhile, during the period Pa of dewatering, a considerably large quantity of washwater flowing form the washing tub is introduced into the drain pump 141, whereas, during the period Pb for constant-speed rotation, a smaller quantity of washwater is introduced compared to the period Pa.

Particularly, the drain pump 141 is not fully filled with washwater but only part of it, thus leading to a residual water state. Due to this residual water state, a speed ripple or the like occurs in the drain motor 630, and noise, vibration, etc. may be generated.

In this regard, in the present disclosure, in order to reduce a speed ripple of the drain motor 630, the main controller 210 may control such that, while the washing tub motor 230 is rotating at a constant speed, the drain motor 630 operates in a first period Pra during which the speed of the drain motor 630 increases, a second period Pfa during which the speed of the drain motor 630 decreases after the first period Pra, and a third period Pfb during which the speed of the drain motor 630 decreases after the second period Pfa. The falling slope in the second period Pfa may be set less than the falling slope in the third period Pfb.

That is, the drain motor 730 decreases its speed separately in a second period Pfa during which the speed decreases slowly and a third period Pfb during which the speed decreases abruptly, and a speed ripple that may be generated in the second period Pfa may be reduced.

Figure 11A:
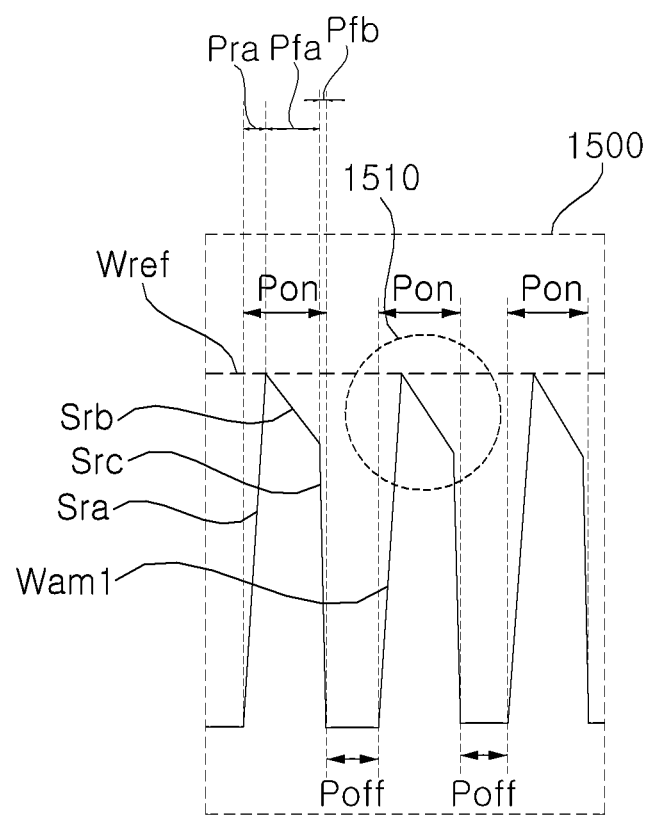

FIG. 11A illustrates an example of the speed waveform Wam1 of the drain motor 630 in the period 1500 of FIG. 15.

Referring to the drawing, the main controller 210 the main controller 210 may control such that, while the washing tub motor 230 is rotating at a constant speed, the drain motor 630 operates in a first period Pra during which the speed of the drain motor 630 increases, a second period Pfa during which the speed of the drain motor 630 decreases after the first period Pra, and a third period Pfb during which the speed of the drain motor 630 decreases after the second period Pfa. The falling slope in the second period Pfa may be set less than the falling slope in the third period Pfb.

Meanwhile, the speed of the drain motor 630 is preferably less than a limit value Wref.

Meanwhile, the main controller 210 may control such that the slope Sfa of decrease in the second period Pfa is less than the slope Sra of increase in the first period Pra.

Meanwhile, the main controller 210 may control such that the first period Pra, the second period Pfa, and the third period Pfb are repeated.

In this way, the speed ripple of the drain motor 630 may be reduced by setting the falling slope in the second period Pfa to be less than the falling slope in the third period Pfb. Accordingly, noise or vibration may be reduced during dewatering.

Meanwhile, in the second period Pfa, the speed of the drain motor 630 may continuously decrease.

Meanwhile, the main controller 210 may perform power control so that the power consumed by the drain motor 630 is constant in the second period Pfa. Accordingly, the converter 410 may supply constant power, thereby improving the stability of the converter 410. Also, the power control may shorten the time taken to complete drainage as compared to speed control.

Similarly, the main controller 210 may perform power control so that the power consumed by the drain motor 630 is constant in the first period Pra, and may perform power control so that the power consumed by the drain motor 630 is constant in the third period Pfb.

In this case, the main controller 210 may control such that the power consumed in the first period Pra or third period Pfb is greater than the power consumed in the second period Pfa.

Figure 11B:
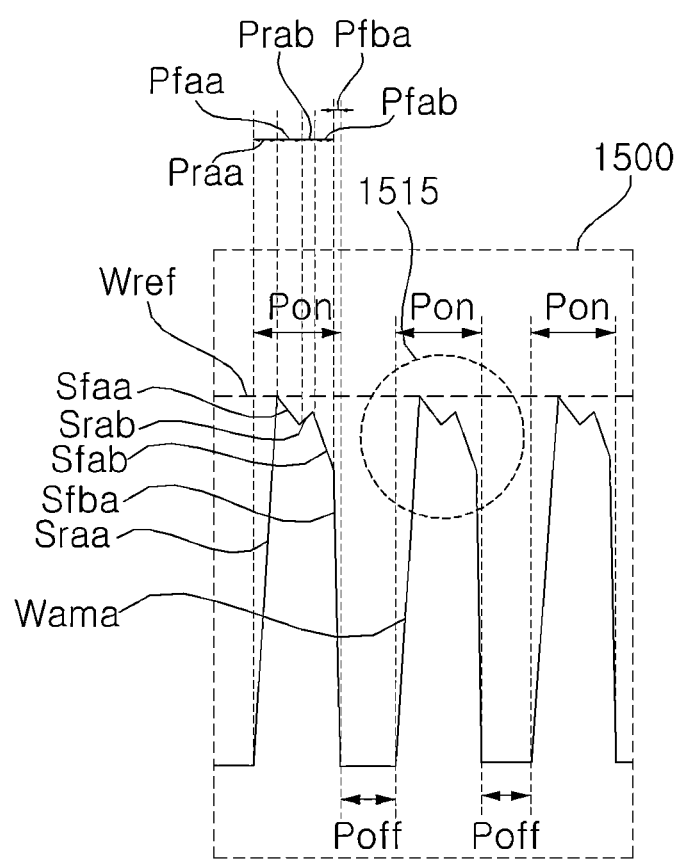
Figure 11C:
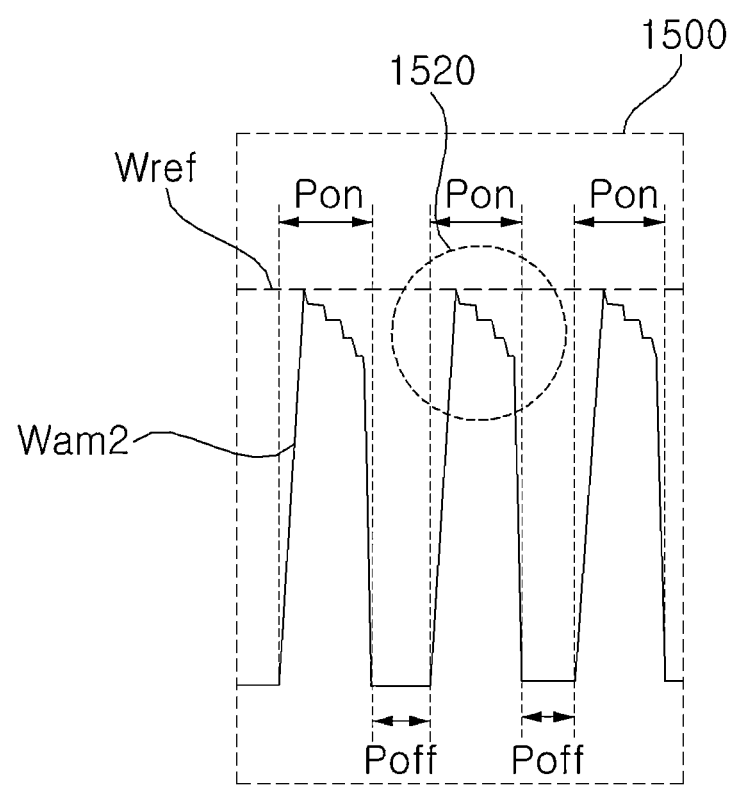

FIG. 11B illustrates another example of the speed waveform Wama of the drain motor 630 of the period 1500 of FIG. 10.

Referring to the drawing, the main controller 210 may control such that, while the washing tub motor 230 is rotating at a constant speed, the drain motor 630 operates in a first period Praa during which the speed of the drain motor 630 increases, a second period Pfaa, Prab, and Pfab during which the speed of the drain motor 630 decreases after the first period Praa, and a third period Pfba during which the speed of the drain motor 630 decreases after the second period Pfaa, Prab, and Pfab. The falling slope in the second period Pfaa, Prab, and Pfab may be set less than the slope Sfab of decrease in the third period Pfba.

In this case, as opposed to FIG. 11A, the second period Pfaa, Prab, and Pfab may include a first decrease period Pfaa, a temporary increase period Prab, and a second decrease period Pfba.

Therefore, the slope Sfaa of decrease in the first decrease period Pfaa of the second period Pfaa, Prab, and Pfab and the slope Sfba of decrease in the second decrease period Pfba may be set less than the slope Sfab of the third period Pfba. Accordingly, the speed ripple of the drain motor 630 may be reduced. Particularly, noise or vibration may be reduced during dewatering.

Meanwhile, the main controller 210 may control such that the slope Srab of the period Prab of the second period during which the speed of the drain motor 630 increases is less than the falling slope in the third period Pfb or the rising slope in the first period Pra. Accordingly, the speed ripple of the drain motor 630 may be reduced. Particularly, noise or vibration may be reduced during dewatering.

Meanwhile, the main controller 210 may perform power control such that the power consumed by the drain motor 630 is constant in the second period Pfaa, Prab, and Pfab. Accordingly, the converter 410 may supply constant power, thereby improving the stability of the converter 410. Also, the power control may shorten the time taken to complete drainage as compared to speed control.

Similarly, the main controller 210 may perform power control so that the power consumed by the drain motor 630 is constant in the first period Praa and the power consumed by the drain motor 630 is constant in the third period Pfba.

In this case, the main controller 210 may control such that the power consumed in the first period Praa or third period Pfba is greater than the power consumed in the second period Pfa, Prab, and Pfba.

FIG. 11C illustrates another example of the speed waveform Wam2 of the drain motor 630 of the period 1500 of FIG. 10.

Referring to the drawing, similarly to FIG. 11A, the main controller 210 may control such that, while the washing tub motor 230 is rotating at a constant speed, the drain motor 630 operates in a first period Pra during which the speed of the drain motor 630 increases, a second period Pfa during which the speed of the drain motor 630 decreases after the first period Pra, and a third period Pfb during which the speed of the drain motor 630 decreases after the second period Pfaa, Prab, and Pfab. The falling slope in the second period Pfaa, Prab, and Pfab may be set less than the slope Sfab of decrease in the third period Pfb Pfab.

Meanwhile, the speed of the drain motor 630 is preferably less than a limit value Wref.

Meanwhile, the main controller 210 may control such that the slope Sfa of decrease in the second period Pfa is less than the slope Sra of increase in the first period Pra.

Meanwhile, the main controller 210 may control such that the first period Pra, the second period Pfa, and the third period Pfb are repeated.

In this way, the speed ripple of the drain motor 630 may be reduced by setting the falling slope in the second period Pfa to be less than the falling slope in the third period Pfb. Accordingly, noise or vibration may be reduced during dewatering.

Meanwhile, as shown in the drawing, in the second period Pfa, the speed of the drain motor 630 may continuously decrease. Accordingly, the speed ripple of the drain motor 630 may be reduced, and noise or vibration may be reduced during dewatering.

Meanwhile, the main controller 210 may control such that, during dewatering, a speed command value of the motor 630 is decreased based on the speed ripple of the motor 630. Accordingly, the speed ripple of the drain motor 630 may be reduced. Particularly, noise or vibration may be reduced during dewatering.

Meanwhile, FIG. 1 illustrates a top loading type machine as a laundry treatment machine, but the drain pump driving apparatus 620 according to an embodiment of the present disclosure may also be applied to a front loading type machine, that is, a drum type machine.

Meanwhile, the drain pump driving apparatus 620 according to an embodiment of the present disclosure may be applied to various machines such as dishwashers and air conditioners, in addition to the laundry treatment machine 100.

The drain pump driving apparatus and the laundry treatment machine according to embodiments of the present disclosure are not limited to the configurations and methods of the above-described embodiments, and various modifications to the embodiments may be made by selectively combining all or some of the embodiments.

Meanwhile, a drain pump driving apparatus and a method for operating a laundry treatment machine according to the present disclosure can be implemented with processor-readable codes in a processor-readable recording medium provided for each of the drain pump driving apparatus and the laundry treatment machine. The processor-readable recording medium includes all kinds of recording devices for storing data that is readable by a processor.

It will be apparent that, although the preferred embodiments of the present disclosure have been illustrated and described above, the present disclosure is not limited to the above-described specific embodiments, and various modifications can be made by those skilled in the art without departing from the gist of the present disclosure as claimed in the appended claims. The modifications should not be understood separately from the technical spirit or prospect of the present disclosure.

What is claimed is:

1. A laundry treatment machine comprising:
a washing tub;
a washing tub motor to rotate the washing tub;
a driver to drive the washing tub;
a drain pump;
a drain motor to operate the drain pump;
a converter to output direct current (DC) voltage;
an inverter to convert the DC voltage from the converter into alternating current (AC) voltage by a switching operation and to output the converted AC voltage to the drain motor; and
a controller configured to control the drain motor,
wherein while the washing tub motor is rotating at a constant speed, the controller is configured to control the drain motor to operate in a first period during which a speed of the drain motor increases, in a second period including a period in which the speed of the drain motor decreases after the first period, and in a third period during which the speed of the drain motor decreases after the second period,
wherein when the washing tub performs dewatering, the controller is configured to control the washing tub to rotate at a constant speed, and to control the drain motor to repeat an on period and an off period, the on period of the drain motor comprises the first period, the second period, and the third period, and
the controller is configured to control the drain motor such that during repetition of the on period and the off period of the drain motor, a length of the on period of the drain motor is longer than a length of the off period of the drain motor, and
the controller is configured to control the drain motor such that a magnitude of a rising slope of a speed waveform in the second period is less than a magnitude of a falling slope of the speed waveform in the third period.

2. The laundry treatment machine of claim 1, wherein the controller is configured to control the drain motor such that the magnitude of the falling slope of the speed waveform in the second period to be less than a magnitude of the rising slope of the speed waveform in the first period.

3. The laundry treatment machine of claim 1, wherein the second period further includes a period in which the speed of the drain motor increases after the period in which the speed of the drain motor decreases.

4. The laundry treatment machine of claim 3, wherein the controller is configured to control the drain motor such that a magnitude of the slope of the speed waveform in the period in which the speed of the drain motor increases in the second period to be less than the magnitude of the falling slope of the speed waveform in the third period or a magnitude of the rising slope of the speed waveform in the first period.

5. The laundry treatment machine of claim 1, wherein the controller is configured to gradually decreases the speed of the drain motor when the speed of the drain motor decreases in the second period.

6. The laundry treatment machine of claim 1, wherein while the speed of the washing tub increases before the washing tub motor is rotating at the constant speed, the controller is configured to control the drain motor to operate in a fourth period during which the speed of the drain motor increases, in a fifth period including a period in which the speed of the drain motor decreases after the fourth period, and in a sixth period during which the speed of the drain motor decreases after the fifth period,
wherein the controller is configured to control the drain motor such that a magnitude of the falling slope of the speed waveform in the fifth period is less than a magnitude of the falling slope of the speed waveform in the sixth period.

7. The laundry treatment machine of claim 6, wherein the controller is configured to control the drain motor such that the magnitude of the falling slope of the speed waveform in the fifth period is less than a magnitude of the rising slope of the speed waveform in the fourth period.

8. The laundry treatment machine of claim 6, wherein the controller is configured to control the drain motor to repeat the fourth period, the fifth period, and the sixth period.

9. The laundry treatment machine of claim 6, wherein the fifth period further includes a period in which the speed of the drain motor increases after the period in which the speed of the drain motor decreases.

10. The laundry treatment machine of claim 9, wherein the controller is configured to control the drain motor such that a magnitude of the slope of the speed waveform in the period in which the speed of the drain motor increases in the fifth period to be less than a magnitude of the falling slope of the speed waveform in the sixth period or a magnitude of the rising slope of the speed waveform in the fourth period.

11. The laundry treatment machine of claim 6, wherein the controller is configured to gradually decreases the speed of the drain motor when the speed of the drain motor decreases in the fifth period.

12. The laundry treatment machine of claim 1, wherein the controller is configured to rotate the drain motor at a set speed during the second period.

13. The laundry treatment machine of claim 1, wherein when a water level of the washing tub decreases during operation of the drain motor, the controller is configured to supply constant power to the drain motor.

14. A laundry treatment machine comprising:
   a washing tub;
   a washing tub motor to rotate the washing tub;
   a driver to drive the washing tub;
   a drain pump;
   a drain motor to operate the drain pump;
   a converter to output direct current (DC) voltage;
   an inverter to convert the DC voltage from the converter into alternating current (AC) voltage by a switching operation and to output the converted AC voltage to the drain motor; and
   a controller configured to control the drain motor,
   wherein while the washing tub motor is rotating at a constant speed, the controller is configured to control the drain motor to operate in a first period during which a speed of the drain motor increases, in a second period during which the speed of the drain motor decreases and then increases after the first period, and in a third period during which the speed of the drain motor decreases after the second period,
   wherein when the washing tub performs dewatering, the controller is configured to control the washing tub to rotate at a constant speed, and to control the drain motor to repeat an on period and an off period, the on period of the drain motor comprises the first period, the second period, and the third period,
   the controller is configured to control the drain motor such that during repetition of the on period and the off period of the drain motor, a length of the on period of the drain motor is longer than a length of the off period of the drain motor, and
   the controller is configured to control the drain motor such that a magnitude of a rising slope of a speed waveform in the second period is less than a magnitude of a falling slope of the speed waveform in the third period.

15. The laundry treatment machine of claim 14, wherein the controller is configured to control the drain motor such that the magnitude of the falling slope of the speed waveform in the second period to be less than a magnitude of the rising slope of the speed waveform in the first period.

16. The laundry treatment machine of claim 14, wherein, when a water level of the washing tub decreases during operation of the drain motor, the controller is configured to supply constant power to the drain motor.

* * * * *